UNITED STATES PATENT OFFICE 2,016,504

DYESTUFFS OF THE OXAZINE SERIES AND A PROCESS OF PREPARING THEM

Georg Kränzlein, Heinrich Greune, and Werner Schultheis, Frankfort - on - the - Main-Höchst, Germany, assignors to General Aniline Works, Inc., New York, N. Y., a corporation of Delaware No Drawing. Application April 24, 1933, Serial No. 667,762. In Germany April 29, 1932

24 Claims. (Cl. 260—28)

The present invention relates to dyestuffs of the oxazine series and to a process of preparing them, more particularly it relates to dyestuffs of the following formula:

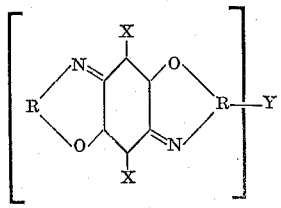

wherein X represents hydrogen, alkyl or halogen, Y means that the dyestuff may be sulfonated and wherein the two R's represent identical bivalent radicals of the pyrene, chrysene- and fluoranthene-series.

We have found that by condensing a 1,4-quinone of the benzene series containing in 2- and 5-position, hydrogen or chlorine, with a monoamino derivative of pyrene, fluoranthene, chrysene or a substitution product thereof containing a free ortho-position to the amino group compounds are obtainable as primary condensation products which may be used as parent materials for the preparation of dyestuffs, for instance, oxazine dyestuffs or sulfur dyes. The condensation to the primary products is advantageously effected by heating the reactants in an inert organic solvent of low boiling point, (for instance, of a boiling point below about 150° C.).

By further heating at a temperature exceeding about 150° C. the primary condensation products prepared from a 1,4-quinone of the benzene series containing in 2- and 5-position hydrogen or chlorine, advantageously in an inert organic solvent of high boiling point, with or without addition of an organic or inorganic oxidizing agent, a metal chloride or an acylating agent, there are obtainable intensely colored condensation products of a different kind which, when finely dispersed, may be directly used as pigment dyes or, when sulfonated, represent valuable water-soluble dyestuffs for vegetable, animal or artificial fibers or for mixed fabrics.

In the form of a barium-, calcium- or other suitable salts, these dyestuff sulfonic acids may also be used as pigments. The new dyestuff sulfonic acids are distinguished by a great affinity for the vegetable fiber and by the good fastness to washing and to light of their dyeings.

The final condensation products of the primary reaction products of 1,4-benzoquinones with the mono-amino derivatives of the above mentioned hydrocarbons or their halogen substitution products may also be obtained directly from the 1,4-benzoquinones and the bases if the condensation is effected under suitable conditions, for instance, by heating at a temperature above about 150° C. the components in an inert organic solvent of high boiling point, advantageously in the presence of an organic or inorganic oxidizing agent, a metal chloride or an acylating agent.

It is also possible to obtain the water-soluble final dyestuffs by suitable treatment of the primary condensation compounds with strong sulfuric acids advantageously with addition of an oxidizing agent or to prepare them by suitable condensation or oxidation of the primary condensation products containing sulfo groups.

The substances obtainable according to the invention are new.

The following examples serve to illustrate the invention, but they are not intended to limit it thereto, the parts being by weight:

(1) 44 parts of 4-aminofluoranthene, melting at 116° C., are dissolved in 700 parts of alcohol. 30 parts of chloranil and 20 parts of anhydrous sodium acetate are added thereto and the whole is boiled for 5 hours. The reaction product precipitates; it is filtered with suction, while hot, and washed with alcohol. The brown condensation product having probably the following formula:

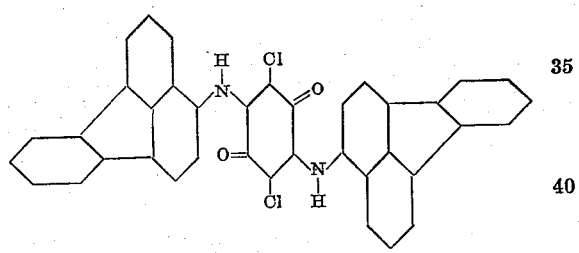

dissolves in concentrated sulfuric acid to an olive green solution. With an alkaline hydrosulfite solution a yellow vat is obtained.

(2) 25 parts of the condensation product of Example 1 are boiled with 375 parts of nitrobenzene and 5 parts of paratoluene sulfonic acid chloride for 2 hours. The solution which is at first brown turns violet and the reaction product precipitates in the form of crystals having a bronze-like luster. At 140° C., the product is filtered with suction and washed with hot nitrobenzene. In a finely dispersed state the new product forms a violent pigment which has the following probable constitution:

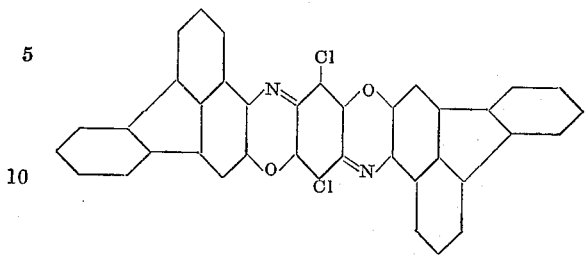

In organic solvents it is difficulty soluble; in strong sulfuric acid it dissolves to a green solution. By causing strong sulfuric acid, chlorosulfonic acid or fuming sulfuric acid to act for a long time upon the new product, sulfonation takes place for example:—

5 parts of the above pigment are dissolved in 100 parts of sulfuric acid monohydrate and stirred for some hours at 20° C.–25° C. The whole is poured on ice, the sulfonic acid obtained is filtered with suction and washed until neutral by means of sodium chloride solution. In water the sulfonic acid dissolves to a red-violet solution and it dyes the vegetable, animal and artificial fibers as well as mixed fabrics red-violet tints. The dyeings have very good fastness properties.

(3) When using in Example 1 instead of 4-aminofluoranthene 11-aminofluoranthene, melting at 168° C., or aminochlorofluoranthene and when treating the condensation product obtained according to the process as indicated in Example 2, there is obtained a violent pigment. After its conversion into the dyestuff sulfonic acid it dyes the vegetable, animal and artificial fibers as well as mixed fabrics red-violet tints. The dyeings have very good fastness properties.

(4) 44 parts of 4-aminofluoranthene are boiled for 5 hours in 1000 parts of alcohol with 74 parts of toluquinone. The condensation product precipitates and is filtered, while hot. It forms a brown product which dissolves in fuming sulfuric acid containing 20% of SO₃ to a blue-green solution. It corresponds to the following probable formula:

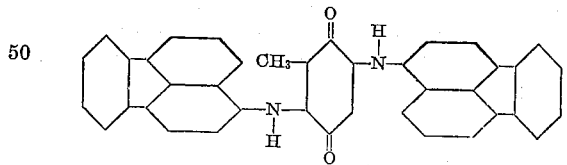

With alkaline hydrosulfite solution there is obtained a red-brown vat. By subsequently treating the condensation product in a manner similar to that of Example 2, there is obtained a dyestuff sulfonic acid which dyes the vegetable, animal and artificial fibers red-violet tints of very good fastness to light.

(5) 17 parts of alpha-naphthoquinone are boiled for 2 hours with 11 parts of 4-aminofluoranthene in 300 parts of glacial acetic acid. The new condensation product of the following probable formula:

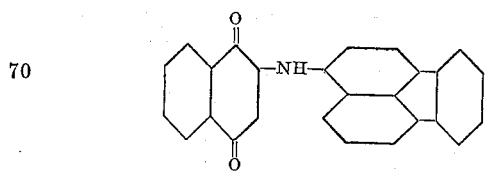

crystallizes. By recrystallizing it from chlorobenzene, it is obtained in the form of red-brown crystals which dissolve in concentrated sulfuric acid to a violet solution.

(6) 44 parts of 3-aminopyrene, melting at 116° C.–117° C., are boiled for 12 hours in 800 parts of alcohol with 30 parts of chloranil and 20 parts of anhydrous sodium acetate and the red-brown reaction product which has precipitated is filtered by suction, while hot. It corresponds to the following probable formula:

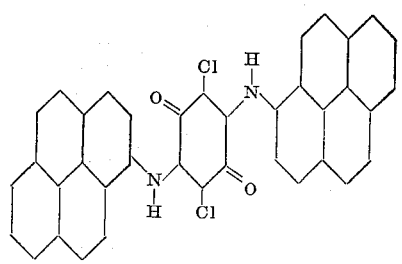

In concentrated sulfuric acid it dissolves to a red-violet solution. In an alkaline hydrosulfite solution it yields a yellow vat.

(7) 10 parts of the condensation product obtainable according to Example 6 are boiled for 3 hours in 200 parts of nitrobenzene with 5 parts of dinitrophenol. The solution which is at first brown soon turns blue-violet. The reaction product precipitates from the hot nitrobenzene in the form of needles having a metallic luster. At 140° C., the product is filtered with suction and washed with hot nitrobenzene. In fuming sulfuric acid containing 20% of SO₃ it dissolves to an olive-green solution. In a finely dispersed state it forms a blue pigment, which may be used for coloring paper or wall-paper or which may be used for printing purposes or as lake dyestuff. It has the following probable constitution:

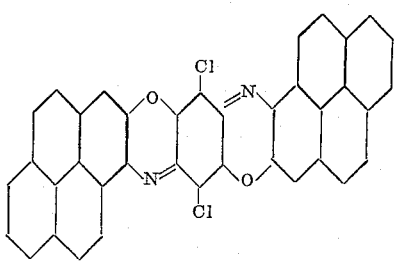

Instead of nitrobenzene there may also be used with a good effect other solvents of high boiling point as, for instance, chlornaphthalene, nitrotoluene, trichlorobenzene or the like.

5 parts of the pigment are stirred at 20° C.–30° C. for some hours in 70 parts of fuming sulfuric acid containing 20% of SO₃ whereby sulfonation takes place. Thereupon, the reaction mixture is poured on ice and the sulfonic acid separates in the form of a blue precipitate. It is filtered with suction and washed until neutral with a sodium chloride solution. The sulfonic acid dissolves in water to a blue solution and dyes the animal, vegetable and artificial fibers as well as mixed fabrics greenish blue tints. The dyeings are distinguished by very good fastness properties. By converting the sulfonic acid into the corresponding barium or calcium salts valuable blue pigment dyes are obtainable which may be used for coloring paper or wall-paper and which are of interest in the color lake industry.

The pigment may also be sulfonated under other conditions. Thus, for instance, there may be used instead of fuming sulfuric acid containing 20% of SO₃ other sulfonating agents of milder or stronger action at lower or higher temperatures.

By using in Example 6 instead of 3-aminopyrene the corresponding quantity of an aminohalogenpyrene and treating the condensation product thus obtained as indicated above there is obtained a glue pigment which dissolves in concentrated sulfuric acid to a green solution. The dyestuff sulfonic acid which may be prepared therefrom dyes the vegetable, animal and artificial fibers blue tints.

(8) 44 parts of 4-aminopyrene, melting at 215° C. are boiled for 3 hours in 800 parts of alcohol with 30 parts of chloranil and 20 parts of anhydrous sodium acetate and the brown reaction product which has precipitated is filtered with suction, while hot. In concentrated sulfuric acid it dissolves to a blue solution. The product corresponds to the following probable formula:

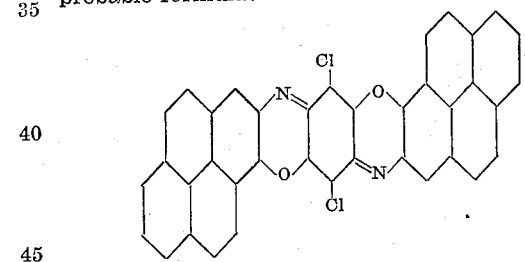

(9) By using in Example 7 instead of the condensation product obtainable according to Example 6, the condensation product obtainable according to Example 8, there is obtained a violet pigment which corresponds to the following probable formula:

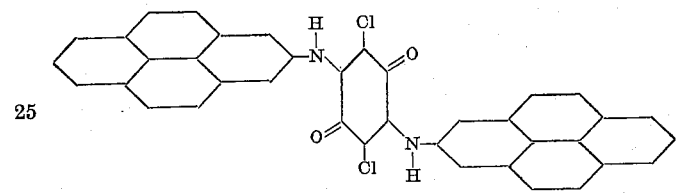

In concentrated sulfuric acid it dissolves to a green solution. By converting it into the sulfonic acid according to the process as indicated in Example 7, there is obtained a dyestuff sulfonic acid which dyes the vegetable, animal and artificial fibers as well as mixed fabrics violet tints. The dyeings obtained are distinguished by very good properties.

(10) 44 parts of 3-aminopyrene are boiled for 5 hours in 1000 parts of alcohol with 65 parts of benzoquinone. The condensation product precipitates, it is filtered with suction and washed with alcohol. It forms a brown product which dissolves in fuming sulfuric acid to a violet solution and yields with an alkaline hydrosulfite solution a yellow vat.

(11) 11 parts of 3-aminopyrene are boiled for several hours in 300 parts of glacial acetic acid with 17 parts of alpha-naphthoquinone. On cooling, the condensation product precipitates. It crystallizes from chlorobenzene in the form of brown crystals which dissolve in sulfuric acid to a blue-violet solution. With an alkaline hydrosulfite solution a red-orange vat is obtained.

(12) 22 parts of aminochrysene, melting at 206° C.–207° C., are boiled for 10 hours in 500 parts of alcohol with 13 parts of chloranil and 10 parts of anhydrous sodium acetate. The reaction product precipitates, it is filtered with suction, while hot, and washed with alcohol. It forms a red-brown product which dissolves in strong sulfuric acid to an olive green solution and yields with an alkaline hydrosulfite solution a yellow vat. The condensation product has the following probable formula:

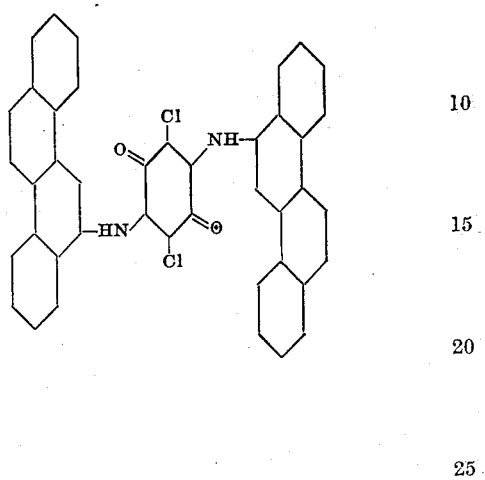

(13) 15 parts of the condensation product obtainable according to Example 12 are boiled for 1 hour in 225 parts of nitrobenzene with the addition of 3 parts of ferric chloride. The reaction product precipitates in the form of needles having a bronze-like luster; it is filtered with suction at 140° C. and washed with hot nitrobenzene. It is very difficultly soluble in organic solvents. In strong sulfuric acid it dissolves to a green solution. In a finely dispersed state it forms a blue-violet pigment of the following probable constitution:

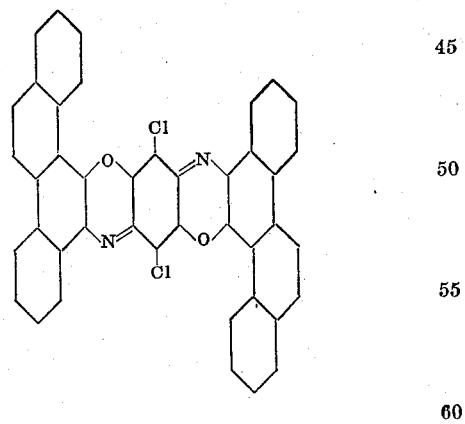

By causing fuming sulfuric acid containing 8% of SO₃ to act on the pigment at about 20° C. to about 25° C., sulfonation takes place. The pigment may likewise be sulfonated by causing it to react with other sulfonating agents at other temperatures. There is obtained a blue sulfonic acid which dissolves in water to a blue solution and dyes the animal, vegetable and artificial fibers as well as mixed fabrics greenish-blue tints. The dyeings obtained have very good properties.

By using in Example 12 instead of aminochrysene, amino-bromo-chrysene and treating the condensation product thus obtained according to the process as indicated in Example 13, a blue pigment is obtained, which dissolves in strong sulfuric acid to a green solution. The dyestuff sulfonic acid obtained therefrom dyes the vegetable, animal and artificial fibers as well as mixed fabrics blue tints of excellent properties.

(14) 10 parts of the condensation product obtainable according to Example 12 are boiled for 5 hours in 200 parts of nitrobenzene. The reaction product precipitates in the form of needles having a bronze-like luster. It is identical with the product obtainable according to Example 13.

(15) 10 parts of the condensation product obtainable according to Example 12 are dissolved in 200 parts of concentrated sulfuric acid and the solution is heated at 100° C.–120° C. for 1 hour. The solution which is at first green turns dirty blue-green. After cooling, the reaction mixture is poured on ice and the blue sulfonic acid which has precipitated is filtered with suction and washed until neutral with a sodium chloride solution. It dissolves in water to a blue solution and, after purification, it is identical in its behavior to the sulfonic acid described in Example 13.

(16) 22 parts of amino-chrysene, melting at 206°–207° C., are boiled for 5 hours with 13 parts of chloranil in 300 parts of trichlorobenzene. The reaction product precipitates in the form of needles having a bronze-like luster and is identical with the condensation product described in Example 13.

We claim:

1. The process which comprises heating a 1,4-quinone compound of the benzene series containing in 2- and 5-position hydrogen or chlorine with a mono-amino-derivative of a compound of the pyrene, fluoranthene and chrysene series containing a free ortho-position to the amino-group.

2. The process which comprises condensing a 1,4-quinone compound of the benzene series containing in 2- and 5-position hydrogen or chlorine with a mono-amino derivative of a compound of the pyrene, fluoranthene and chrysene series containing a free ortho-position to the amino group in the presence of an inert organic boiling solvent with a boiling point below about 150° C.

3. The process which comprises condensing a 1,4-benzo-quinone compound containing in 2- and 5-position hydrogen or chlorine with a mono-amino-derivative of a compound of the pyrene, fluoranthene and chrysene series containing a free ortho-position to the amino group in the presence of an inert organic boiling solvent with a boiling point below about 150° C. and further boiling the intermediate product thus obtained in an inert organic high boiling solvent.

4. The process which comprises condensing a 1,4-benzoquinone compound containing in 2- and 5-position hydrogen or chlorine with a mono-amino-derivative of a compound of the pyrene, fluoranthene and chrysene series containing a free ortho-position to the amino group in the presence of an inert organic boiling solvent with a boiling point below about 150° C. and further boiling the intermediate product thus obtained in an inert organic high boiling solvent and finally sulfonating the dyestuff thus obtained.

5. The process which comprises heating a 1,4-benzoquinone compound containing in 2- and 5-position hydrogen or chlorine with 4-amino-fluoranthene.

6. The process which comprises condensing a 1,4-benzoquinone compound containing in 2- and 5-position hydrogen or chlorine with 4-amino-fluoranthene in the presence of an inert organic boiling solvent with a boiling point below about 150° C.

7. The process which comprises condensing a 1,4-benzoquinone compound containing in 2- and 5-position hydrogen or chlorine with 4-amino-fluoranthene in the presence of an inert organic boiling solvent with a boiling point below about 150° C. and further boiling the intermediate product thus obtained in an inert organic high boiling solvent.

8. The process which comprises condensing a 1,4-benzoquinone compound containing in 2- and 5-position hydrogen or chlorine with 4-amino-fluoranthene in the presence of an inert organic boiling solvent with a boiling point below about 150° C. and further boiling the intermediate product thus obtained in an inert organic high boiling solvent and finally sulfonating the dyestuff thus obtained.

9. The process which comprises heating a 1,4-benzoquinone compound containing in 2- and 5-position hydrogen or chlorine with 3-amino-pyrene.

10. The process which comprises condensing a 1,4-benzoquinone compound containing in 2- and 5-position hydrogen or chlorine with 3-amino-pyrene in the presence of an inert organic boiling solvent with a boiling point below about 150° C.

11. The process which comprises condensing a 1,4-benzoquinone compound containing in 2- and 5-position hydrogen or chlorine with 3-amino-pyrene in the presence of an inert organic boiling solvent with a boiling point below about 150° C. and further boiling the intermediate product thus obtained in an inert organic high boiling solvent.

12. The process which comprises condensing a 1,4-benzoquinone compound containing in 2- and 5-position hydrogen or chlorine with 3-amino-pyrene in the presence of an inert organic boiling solvent with a boiling point below about 150° C. and further boiling the intermediate product thus obtained in an inert organic high boiling solvent and finally sulfonating the dyestuff thus obtained.

13. The process which comprises heating a 1,4-benzoquinone compound containing in 2- and 5-position hydrogen or chlorine with amino-chrysene.

14. The process which comprises condensing a 1,4-benzoquinone compound containing in 2- and 5-position hydrogen or chlorine with amino-chrysene in the presence of an inert organic boiling solvent with a boiling point below about 150° C.

15. The process which comprises condensing a 1,4-benzoquinone compound containing in 2- and 5-position hydrogen or chlorine with amino-chrysene in the presence of an inert organic boiling solvent with a boiling point below about 150° C. and further boiling the intermediate product thus obtained in an inert organic high boiling solvent.

16. The process which comprises condensing a 1,4-benzoquinone compound containing in 2- and 5-position hydrogen or chlorine with amino-chrysene in the presence of an inert organic boiling solvent with a boiling point below about 150° C. and further boiling the intermediate product thus obtained in an inert organic high boiling solvent and finally sulfonating the dyestuff thus obtained.

17. The process which comprises boiling a solution of 4-amino-fluoranthene in alcohol with chloranil in the presence of anhydrous sodium acetate, isolating the intermediate product thus obtained and further boiling it in nitrobenzene in the presence of para-toluene-sulfonic acid chloride and finally sulfonating the dyestuff thus obtained by dissolving it in sulfuric acid monohydrate and stirring it for some hours at about 20° C. to about 25° C.

18. The process which comprises boiling a solution of 3-amino-pyrene (melting point 116° C.-117° C.) in alcohol with chloranil in the presence of anhydrous sodium acetate, isolating the intermediate product thus obtained and further boiling it in nitrobenzene in the presence of dinitrophenol and finally sulfonating the dyestuff thus obtained by dissolving it in fuming sulfuric acid of 20% strength and stirring it for some hours at about 20° C. to about 30° C.

19. The process which comprises boiling a solution of amino-chrysene in alcohol with chloranil in the presence of anhydrous sodium acetate, isolating the intermediate product thus obtained and further boiling it in nitrobenzene in the presence of ferric chloride and finally sulfonating the dyestuff thus obtained by dissolving it in fuming sulfuric acid of about 8% strength and stirring it for some hours at about 20° C. to about 25° C.

20. The compounds of the following formula:

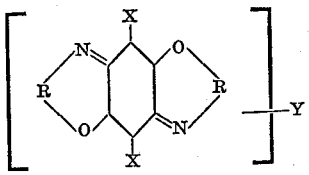

wherein X means hydrogen, methyl or chlorine, Y means that the dyestuff may be sulfonated and wherein the two R's represent identical bivalent radicals of the pyrene, chrysene and fluoranthene series, being bound in two adjacent positions to the nitrogen and oxygen atoms of the molecule.

21. The compounds of the following formula:

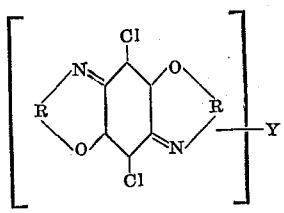

wherein Y means that the dyestuff is sulfonated and wherein the two R's represent identical bivalent radicals of the pyrene, chrysene and fluoranthene series, being bound in two adjacent positions to the nitrogen and oxygen atoms of the molecule.

22. The compound of the following formula:

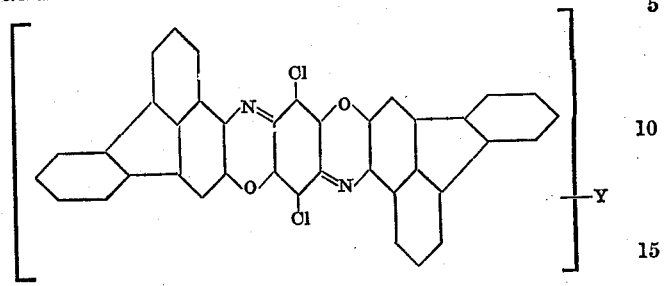

wherein Y means that the dyestuff is sulfonated, dissolving in water to a red-violet solution and dyeing the vegetable, animal and artificial fiber as well as mixed fabrics red-violet tints, the dyeings having very good fastness properties.

23. The compound of the following formula:

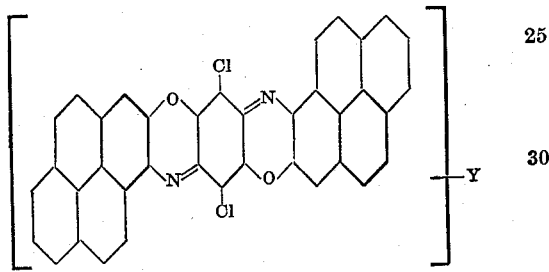

wherein Y means that the dyestuff is sulfonated, dissolving in water to a blue solution and dyeing the animal, vegetable and artificial fiber as well as mixed fabrics greenish-blue tints, the dyeings having very good fastness properties.

24. The compound of the following formula:

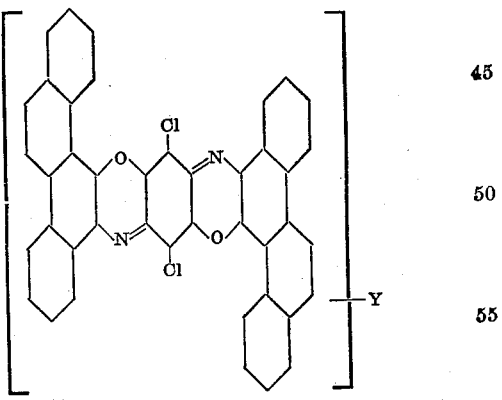

wherein Y means that the dyestuff is sulfonated, dissolving in water to a blue solution and dyeing the animal, vegetable and artificial fiber as well as mixed fabrics greenish-blue tints, the dyeings having very good fastness properties.

GEORG KRÄNZLEIN.
HEINRICH GREUNE.
WERNER SCHULTHEIS.